(12) United States Patent
Rueda (10) Patent No.: US 11,618,520 B2
(45) Date of Patent: Apr. 4, 2023

(54) CABLEWAY SYSTEM THAT IS USED TO TRANSPORT OCCUPIED VEHICLES BETWEEN A PAIR OF TRANSFER STATIONS

(71) Applicant: Victor Hugo Rueda, Bucaramanca (CO)

(72) Inventor: Victor Hugo Rueda, Bucaramanca (CO)

(*) Notice: Subject to any disclaimer, the term of this patent is extended or adjusted under 35 U.S.C. 154(b) by 349 days.

(21) Appl. No.: 17/097,778

(22) Filed: Nov. 13, 2020

(65) Prior Publication Data
US 2022/0153316 A1 May 19, 2022

(51) Int. Cl.
| | |
|---|---|
| *B62D 65/18* | (2006.01) |
| *B61B 10/02* | (2006.01) |
| *B61B 1/00* | (2006.01) |
| *B61B 3/00* | (2006.01) |
| *B61B 1/02* | (2006.01) |
| *B61B 7/04* | (2006.01) |
| *B61B 15/00* | (2006.01) |

(52) U.S. Cl.
CPC .............. *B62D 65/18* (2013.01); *B61B 1/005* (2013.01); *B61B 1/02* (2013.01); *B61B 3/00* (2013.01); *B61B 7/04* (2013.01); *B61B 10/027* (2013.01); *B61B 15/00* (2013.01)

(58) Field of Classification Search
CPC .. B61B 1/00; B61B 1/005; B61B 1/02; B61B 3/00; B61B 7/04; B61B 10/00; B61B 10/02; B61B 10/022; B61B 10/025; B61B 10/027; B61B 13/00; B61B 15/00; B61D 45/00; B61D 45/001; B61D 47/00; B61D 47/005; B62D 65/18; B65G 47/29
See application file for complete search history.

(56) References Cited

U.S. PATENT DOCUMENTS

| | | | | |
|---|---|---|---|---|
| 6,374,993 | B1 * | 4/2002 | Tetzloff | B65G 49/0463 198/465.4 |
| 9,555,974 | B2 * | 1/2017 | Robbin | B62D 65/022 |
| 10,150,455 | B1 * | 12/2018 | Gile | B65G 47/66 |
| 10,494,043 | B2 * | 12/2019 | Pych | B65G 17/40 |
| 2011/0005897 | A1 * | 1/2011 | Schafer | B65G 47/244 198/373 |
| 2013/0209169 | A1 * | 8/2013 | Chew | E01F 9/529 404/15 |

FOREIGN PATENT DOCUMENTS

| | | | | |
|---|---|---|---|---|
| DE | 102017007330 | A1 * | 2/2019 | |
| FR | 2847873 | A1 * | 6/2004 | B61B 1/00 |

* cited by examiner

*Primary Examiner* — S. Joseph Morano
*Assistant Examiner* — Cheng Lin
(74) *Attorney, Agent, or Firm* — Ruben Alcoba, Esq.

(57) ABSTRACT

A continuously moving cableway system for the transport of cars with passengers on board has two pairs of track cables, which extend between, two towers. Specially fitted open transport cabins, are moved along the track cables by at least one traction cable. Speed reducers located at ground level outside of the two towers. Access control, toll type, with rising arm barrier outside of the two towers. Security gates actioned by hydraulic jacks located at ground level outside of the two towers. Conveyor belts located at ground level between the two towers. Roller ramps, conveyor belt, security gates actioned by hydraulic jacks inside of the specially fitted open transport, cabins.

2 Claims, 10 Drawing Sheets

CABLEWAY SYSTEM THAT IS USED TO TRANSPORT OCCUPIED VEHICLES BETWEEN A PAIR OF TRANSFER STATIONS

CROSS REFERENCE

The present application is a continuation of U.S. Provisional Patent Application No. 62/940,959, titled A Continuously Moving Cableway System for Transporting Cars With Passengers on Board, that was filed on Nov. 27, 2019, which is incorporated herein by reference.

TECHNICAL FIELD

The present invention is in the field of transportation, more specifically it is a cableway system that is used to transport occupied vehicles between a pair of transfer stations.

BACKGROUND

The present invention relates to a cableway system that is used to transport occupied vehicles between two transfer stations. such as valley station and a mountain station. Transport vehicles, such as gondolas, are moved on the cableway system.

Presently there are cableway systems that use transport vehicles to transport people from a valley station to a mountain station, yet their boarding system do not serve to transport vehicles on the cableway systems.

The current cableway systems used to transport people are operated manually. Operators of the cableway systems manually decouple the transport vehicles from the cableway systems when allowing passengers to enter and exit the transport vehicles from the cableway systems. The cableway systems are not designed to transport personal cars on the transport vehicles of the cableway systems.

The present art of cableway systems uses closed transport vehicles, such as gondolas, to transport people. The gondolas have side doors that do not serve to transport personal cars on the gondolas.

SUMMARY

It is an object of the present invention to provide a cableway system that will allow personal cars to be transported on transport vehicles of the cableway systems.

The cableway system that is used to transport occupied vehicles between a pair of transfer stations comprises of a pair of towers, each tower is located at each transfer station, each tower is comprised of a cable track support. At least one cable track that is mounted on the cable track supports, the at least one cable track forms a closed loop between the pair of towers. A vehicle transport cabin that is fixedly attached to the at least one cable track, the vehicle transport cabin has a cabin conveyor belt that turns on upon sensing a personal vehicle and that loads the personal vehicle up to a certain position on the vehicle transport cabin, a pair of hydraulic jacks that activate a pair of locks to secure the personal vehicle in place on the transport cabin upon the personal vehicle reaching the certain position, each vehicle transport cabin has a roller entrance ramp and a roller exit ramp. A pair of entrance conveyor belt systems, each entrance conveyor belt system is comprised of a speed reducer that is immediately followed by first conveyor belt, a barrier that follows the first conveyor belt, and a second conveyor belt that follows the barrier, each conveyor belt system is on an entrance side of each transfer station. And a pair of exit conveyor belts, each exit conveyor belt is at an exit of each transfer station.

In a preferred embodiment, the barrier will have arms and sensors that monitor the entrance and exit of personal vehicles from the transfer stations.

Potential Areas for Application of Present Invention

Continuously moving cableway system can be used in practically all regions of the world. Private cars with passengers on board will be able to ascend and descend in a straight line almost any mountain, snowy or mountain range, and also cross in a straight line any portion of sea, river, lake, lagoon or muddy terrain.

The low cost to build continuously moving cableway systems, per linear kilometer, and their use for Tourism and potentially for cargo transportation will be its great competitive advantage compared to other means of transportation.

The continuously moving cableway system for transporting cars with passengers on board will make possible the dream of people to connect the world or its continents in a different way than the already known (seaborne or airborne) by using their own private cars.

The continuously moving cableway system for transporting cars with passengers on board will connect some continents in the world, or regions from a country or countries, separated nowadays by famous straits as the listed below:

"Bering Strait", connecting the continents of Asia and America, more precisely Russia with the state of Alaska in the United States. The continuously moving cableway system would connect Wales in Alaska to a location south of Uelen. The continuously moving cableway system would pass through the Diomedes Islands, which are located in the center of the Bering Strait. With the continuously moving cableway system, a tunnel would not be required to traverse the Diomedes Islands, whose island of Greater Diomedes is over 1,000 feet high at its highest point.

"English Channel—La Manche", connecting the countries of France and Great Britain. Due to the low cost of the continuously moving cableway system compared to other systems and the Eurotunel itself, Europeans' dream of crossing the English Channel in one direction or the other in their own cars can be made possible by increasing tourism on both sides of the Chanel.

"Gibraltar Strait", connecting the continents of Europe and Africa, more precisely Spain with Morocco.

"Taiwan Strait", connecting the Continental China and Taiwan Island.

"North Channel", connecting the countries of North Ireland and Scotland.

"Ormuz Strait", connecting the country of Iran and Musandam (portion of Oman).

"Saint George's Channel", connecting the countries of Wales and Ireland.

"Messina Strait", connecting the Sicily Island and the continental portion of Italy.

"Malaca Strait", connecting the countries of Indonesien, Malaysia and Singapur.

"Babel-Mandeb Strait", connecting the countries of Eritrea, Yibuti and Yemen.

The inventor believes that the continents of North America and South America, that are separated by only 67 miles due to a significant geographic accident known as the "Tapon del Darien", located between the borders of Colombia and Panama, can now be connected using the present invention. The cableway system of the present invention has the great advantage that it does not require the whole intervention of the passage where the project is going to extend, as it will only need a very detailed intervention in those exact places where will be located the piles or bases of the towers that will support the load of the electrical and wiring system.

The continuously moving cableway system of the present invention will be very useful and have great competitive advantages in mountainous geographic areas, with large differences in height, where the access by a road or railway can result very difficult. Some, examples can be in Asia, great part of Europe, as the Alps and Pyrenees in France, Switzerland and Italy or in the Gibraltar region in Spain and Andes Mountains in South America where constructing a mile of road or a mile of tunnel can result more expensive and cause a severe environmental impact. Furthermore, the construction time will be less than the time for the road or tunnel construction mentioned above.

The continuously moving cableway system of the present invention will connect cities, towns or rural zones that are relatively close to each other in straight line but are separated by physical barriers such as the open sea, huge rivers, lakes, and lagoons at a relatively low cost compared to viaducts. Viaducts are tens or hundreds of times more expensive to build and they have a severe environmental impact on the geography in which they are built. For example, we could consider the feasibility to connect the city of Maracaibo with the town of Santa Rita (Zulia state) in Venezuela as the Maracaibo Lake separates them by only 10.73 miles in straight line but using a road they are separated by hundreds of miles.

The continuously moving cableway system can also be applied in cities with a very large population as Los Angeles, Shanghai, Tokyo, New Delhi, Sao Paulo, Mexico City, Bogota and Cairo where crossing the city in a car can take hours. This system has the great advantage to go over and use the same way or path as the large highways that often have traffic jam.

We could consider the application of the continuously moving cableway system for the transportation of cargo between two points that are relatively close to each other in straight line but separated by some of the geographic accident mentioned before. It takes a lot more time to go from one place to another using the conventional modes of transportation as roads or tunnels inside a mountain.

Advantages of the Present Invention

Advantages of the present invention shall be categorized as follows:
Advantages for the Driver:
Financial: during the time that the car is transported by the cableway system, significant reductions in vehicle consumption and supplies may be obtained as a direct consequence of less mileage traveled. Reductions will be obtained in the consumption of: fuel, tires, brake pads and corrective maintenance (oil change, filters, brake pads shock, absorbers, others).

Quality of life: reduction of the stress in many drivers, since from the moment the driver enters his car on the first conveyor belt, turns off his car and applies the hand or foot brake, he and his companions can dedicate during the time of the tour to any of the following activities: a) Rest and enjoy the scenery and environment; b) To Sleep; c) To Read and/or carry out some type of activity or work on your laptop, cell phone or other electronic device.

Time savings: in some cases it will be possible to obtain significant reductions in travel times on a given route between towns or cities located relatively close but separated by large geographical accidents.
Advantages for the Operator or Owner of the Cableway System:
Tourism: the use of this system could become the most attractive worldwide, as it allows the driver and his companions to enjoy the surrounding landscape, the geographical accidents, snow, sea, slopes and large differences in height and others while resting.

Environmental; a) Use of clean energy coming in good part from the electrical energy generated by hydroelectric plants; b) Reduction of transport noise levels; c) Reduction of polluting gases such as: NOX, CO and SO2; d) Reduction of greenhouse gases.

Financial; a) Lower cost of kilometer built compared to other systems; b) due to similar experiences in the construction of traditional cableway systems for the transport of people, great time savings are expected compared to the times required for the construction of a road or tunnel in a mountainous area, which in turn translates into a financial gain; c) Lower maintenance cost per kilometer compared, to other systems.

BRIEF DESCRIPTION OF THE DRAWINGS

These and other features, aspects, and advantages of the present invention will become better understood with regards to the following description, appended claims, and drawings where:

DETAILED DESCRIPTION

As seen in FIGS. 1-11, a cableway system 100 that is used to transport occupied vehicles 200 between a pair of transfer stations 300. The cableway system 100 comprises of a pair of towers 10, each tower 10 is located at each transfer station 300, each tower 10 is comprised of a cable track support 12. At least one cable track 14 that is mounted on the cable track supports 12, the at least one cable track 14 forms a closed loop between the pair of towers 10. A vehicle transport cabin 20 that is fixedly attached to the at least one cable track 14, the vehicle transport cabin 20 has a cabin conveyor belt 22 that turns on upon sensing a personal vehicle 200 and that loads the personal vehicle 200 up to a certain position 24 on the vehicle transport cabin 20, a pair of hydraulic jacks 26 that activate a pair of locks 28 to secure the personal vehicle 200 in place on the vehicle transport cabin 20 upon the personal vehicle 200 reaching the certain position 24, each vehicle transport cabin 20 has a roller entrance ramp 21 and a roller exit ramp 23. A pair of entrance conveyor belt systems 30, each entrance conveyor belt system is comprised of a speed reducer 32 that is immediately followed by first conveyor belt 33, a barrier 34 that follows the first conveyor belt 33, and a second conveyor belt 35 that follows the barrier 34, each entrance conveyor belt system 30 is on an entrance side 300a of each transfer station 300. And, a pair of exit conveyor belts 38, each exit conveyor belt 38 is at an exit 300b of each transfer station 300.

The speed reducers 32 force a driver to slow down prior to entering the entrance conveyor belt system 30, the barrier 34 has a sensor 40 that detects the personal vehicle 200 on the entrance conveyor system 30 and that governs the entrance of the personal vehicle 200 on to the cableway system 100, the first conveyor belt 33 and the second conveyor belt 35 are activated by the barrier 34, after the barrier 34 is opened, to move at the same speed upon the vehicle transport cabin 20 being detected and upon the personal vehicle 200 clearing the first conveyor belt 33, the first conveyor belt 33 is stopped and the barrier 34 is closed, the second conveyor belt 35 moves at a greater speed than the vehicle transport cabin 20 so that the personal vehicle 200 will be loaded into the vehicle transport cabin 20 by the movement of the second conveyor belt 35.

Figure 7:
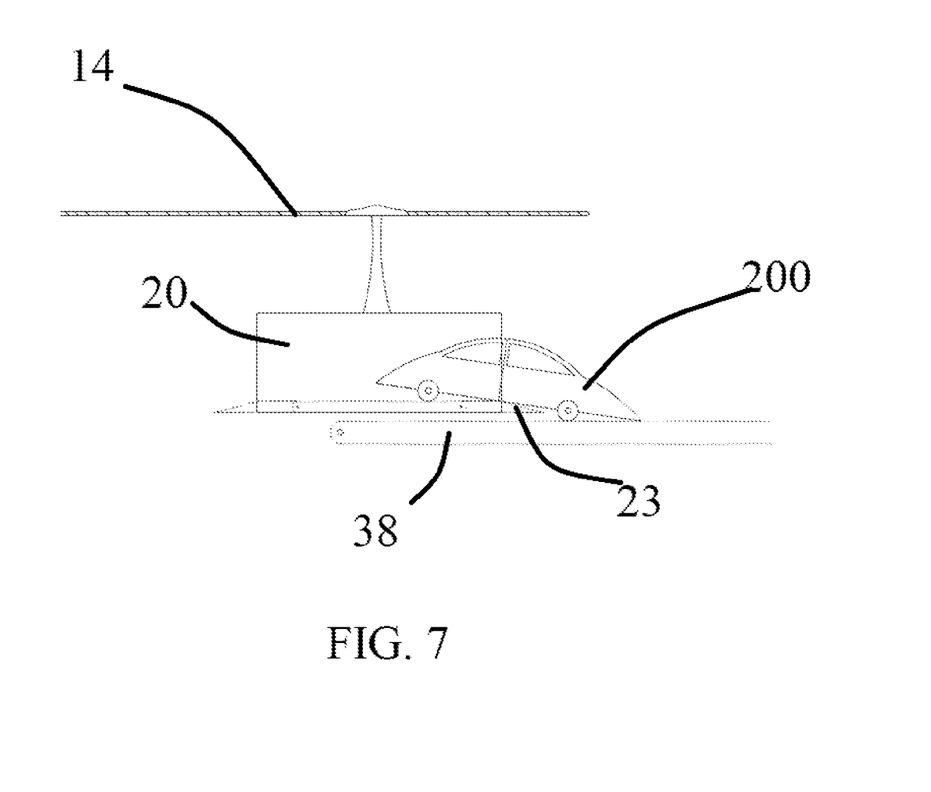
FIG. 7 is a side view of a portion of the continuously moving cableway system in the region of the second tower, with a car leaving the specially fitted open vehicle transport, cabin.
Figure 8:
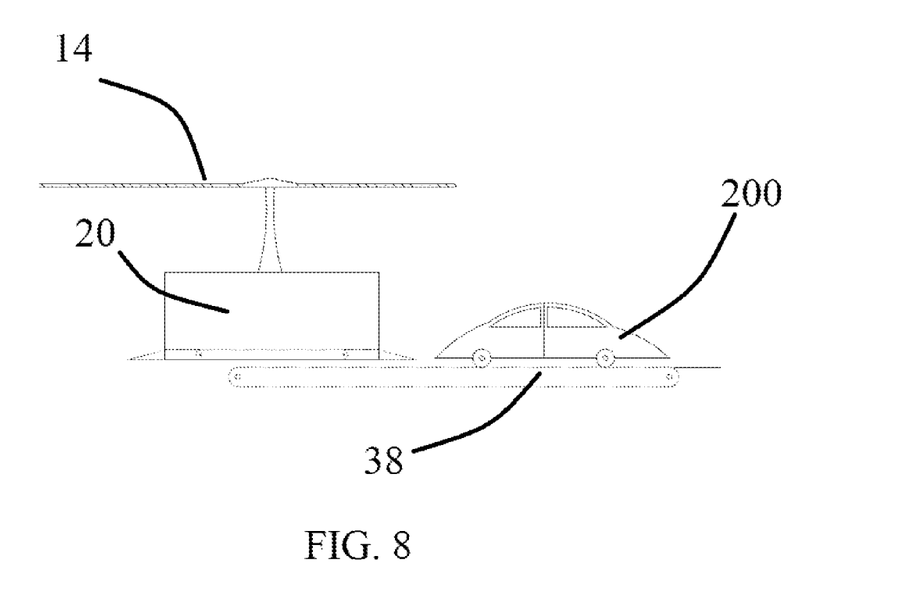
FIG. 8 is a side view of a portion of the continuously moving cableway system in the region of the second tower, with a car moving away from the specially fitted open vehicle transport cabin.
Figure 9:
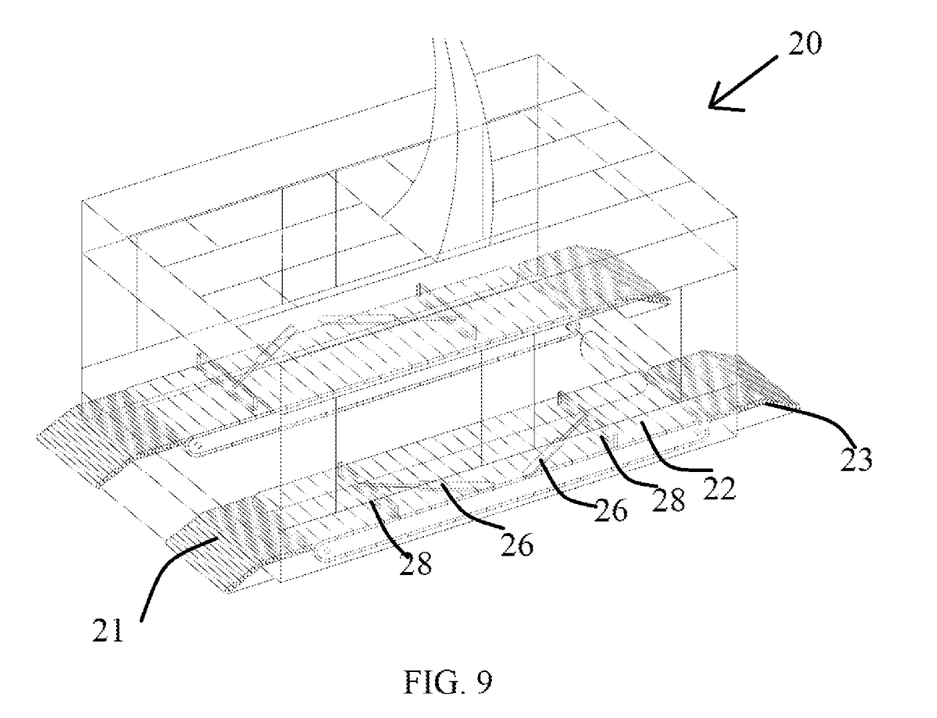
FIG. 9 is a perspective view of the specially fitted open vehicle transport cabin.
Figure 10:
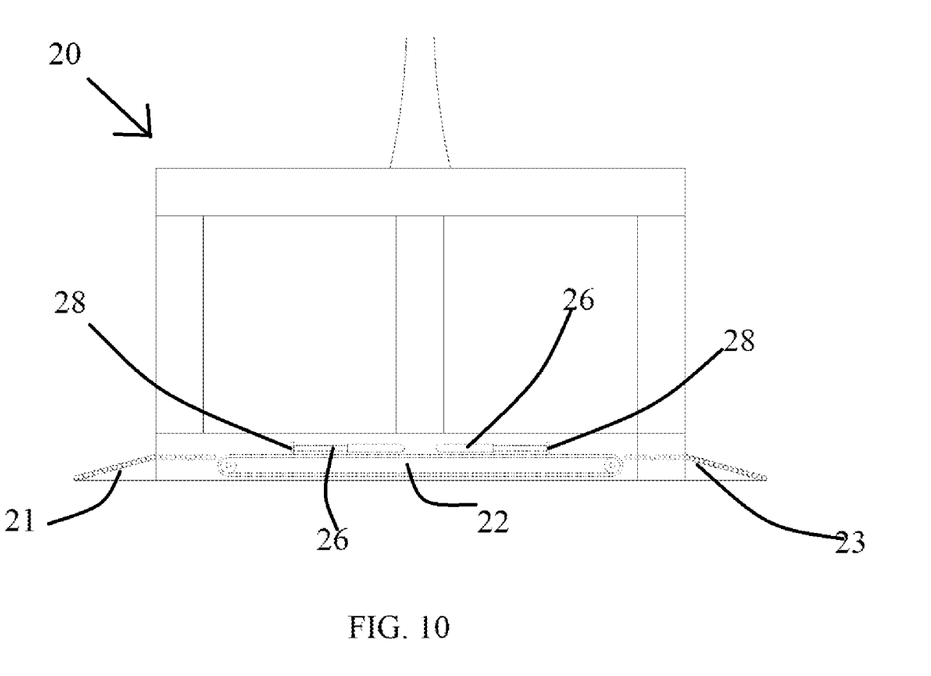
FIG. 10 is a side view of the specially fitted open vehicle transport cabin.
Figure 11:
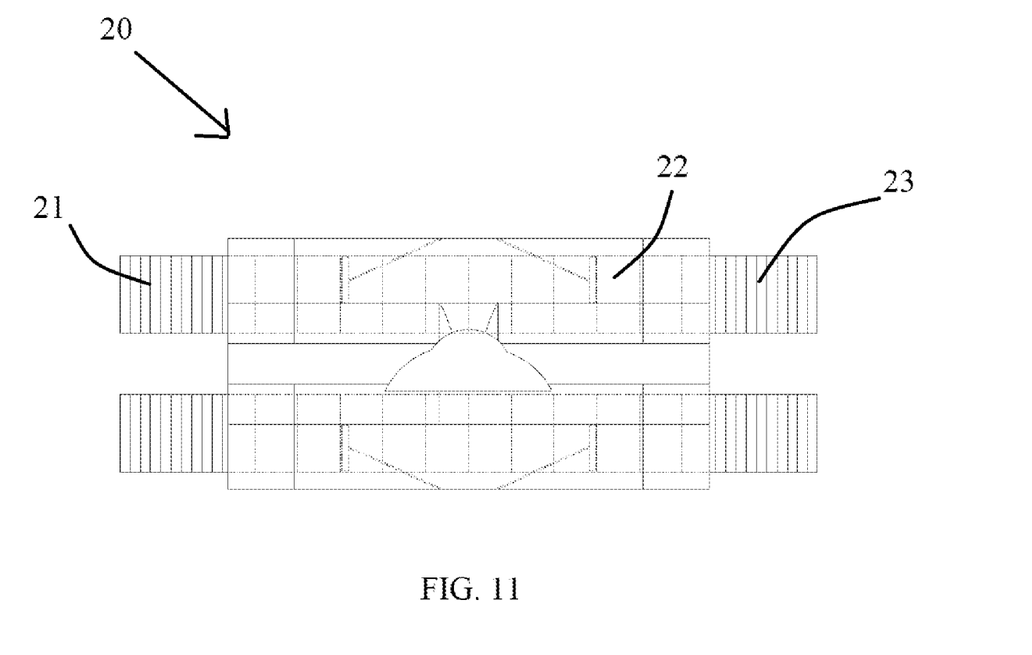
FIG. 11 is a plant view of the specially fitted open vehicle transport cabin.

Each exit conveyor belt 38 shall be activated to turn on when the vehicle transport cabin 20 is detected, upon the vehicle transport cabin 20 reaching the exit conveyor belt 38, the hydraulic jacks 26 release the locks 28 and the cabin conveyor belt 22 is activated to take the personal vehicle 200 out of the vehicle transport cabin 20, the exit conveyor belts 38 operate at a greater linear speed than the vehicle transport cabin 20 so that the personal vehicle 200 clears the vehicle transport cabin 20 safely upon it being unloaded from the cableway system 100.

Figure 1:
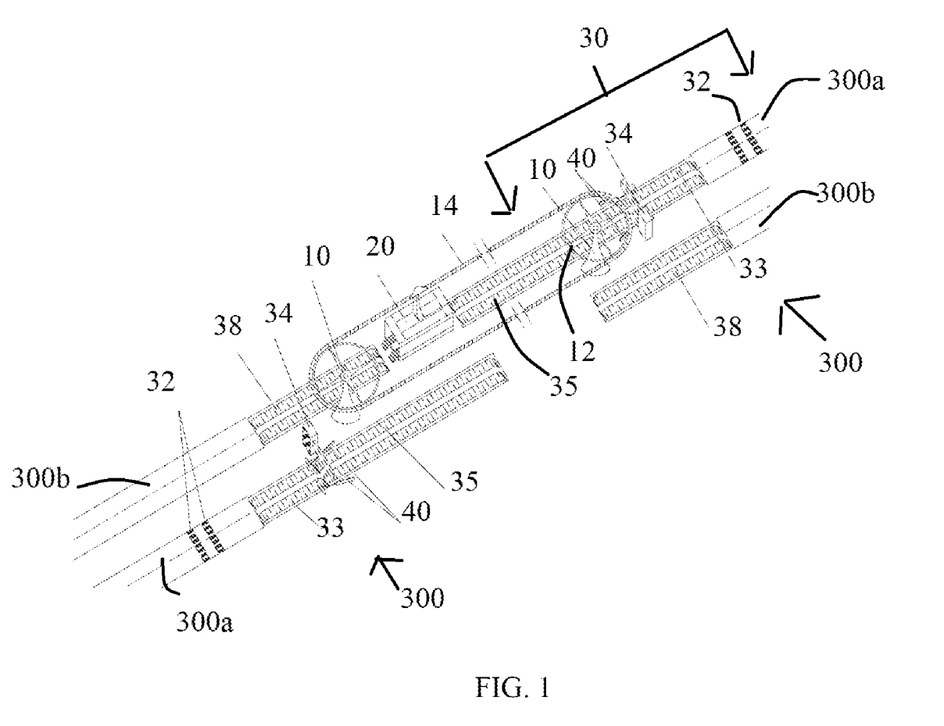
FIG. 1 is a perspective view of a continuously moving cableway system according to the invention.

Referring to the figures of the drawing in detail and first to FIG. 1, there is shown a continuously moving cableway system 100 for transporting personal vehicles 200.

Figure 2:
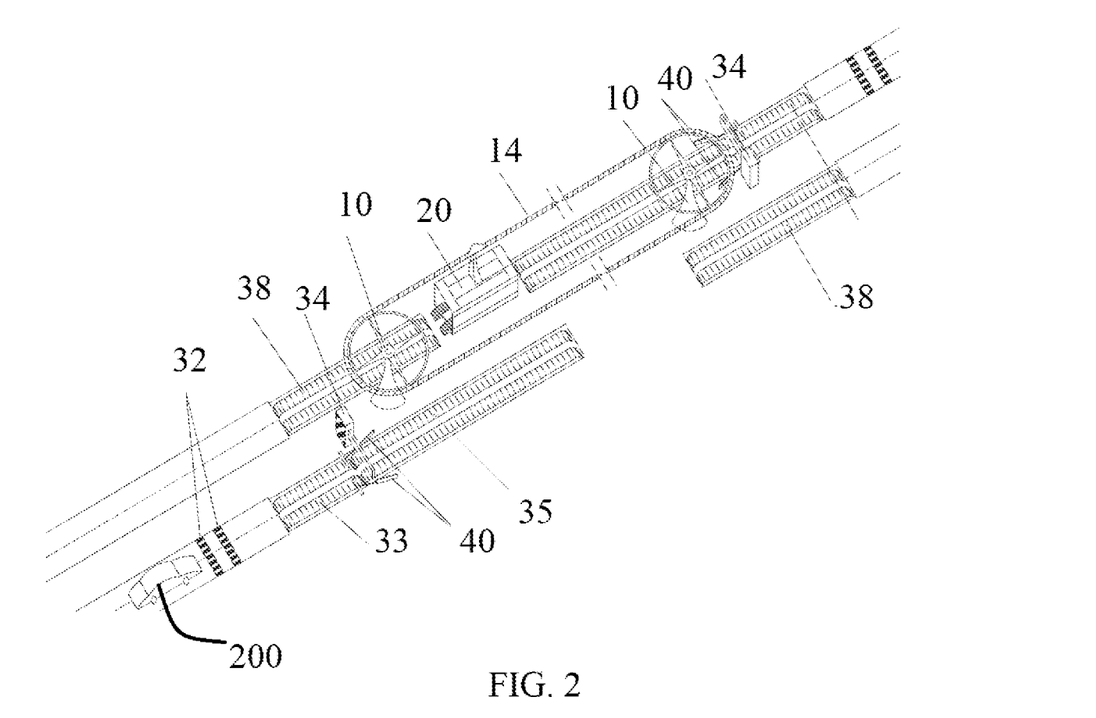
FIG. 2 is a perspective view of a continuously moving cableway system in the region of the first tower, with a car located just, before speed reducers.

FIG. 2 shows a personal vehicle arriving at the cableway system 100. Speed reducers 32 located at ground level immediately before the first conveyor belt 33. The purpose of these speed reducers 32 is to force a driver of the personal vehicle 200 to slow down before entering the first conveyor belt 33.

Figure 3:
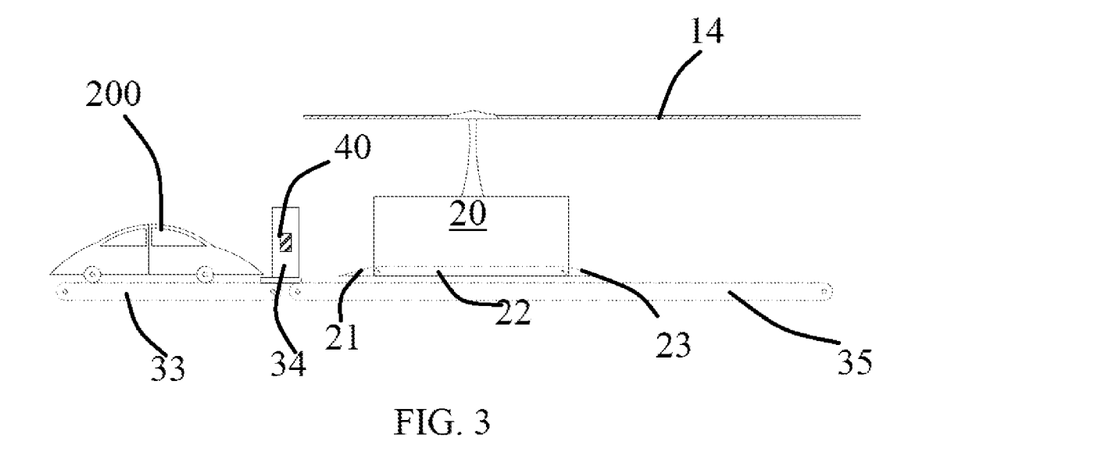
FIG. 3 is a side view of a portion of the continuously moving cableway system in the region of the first tower, with a car located at the end of the first conveyor belt.

FIG. 3 shown the personal vehicle at the end of the first conveyor belt 33 and at a stop before the barrier 34. A sensor 40 detects the front of the personal vehicle 200 and activates a voice recording and/or visual signal that tells the car's driver to turn it off and immediately activate the hand or foot brake of the personal vehicle 200.

Figure 4:
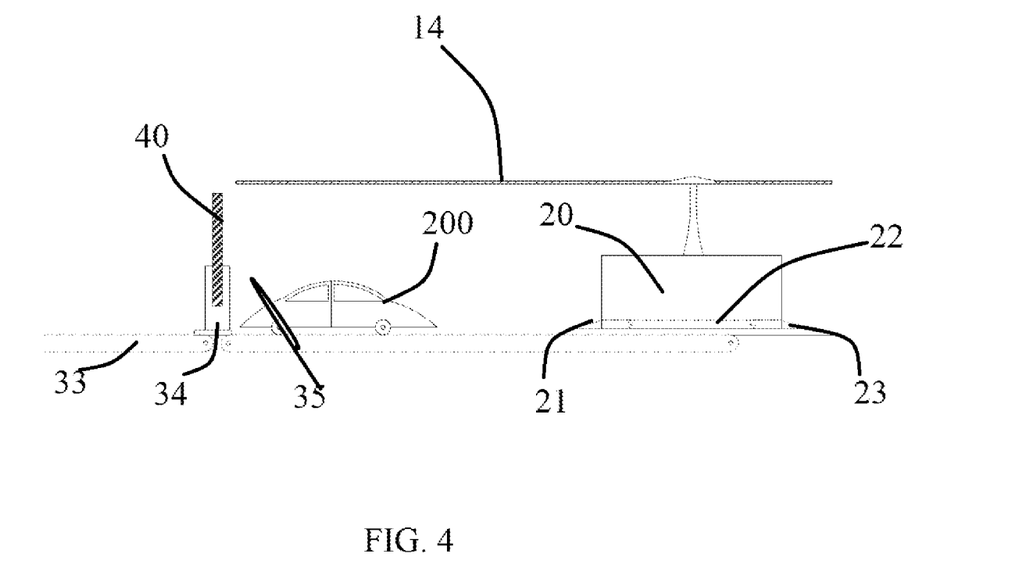
FIG. 4 is a side view of a portion of the continuously moving cableway system in the region of the first, tower, with a car located on the second conveyor belt.

FIG. 4 shows when the personal vehicle has been moved from the first conveyor belt 33 to the second conveyor belt 35. An electronic device located in the continuously moving cableway system detects the nearest vehicle transport cabin 20 that approaches the curve path and sends an electronic signal to raise the arm of the barrier 34 and simultaneously to activate the first and second conveyor belts 33, 35 and open the barrier 34 to allow the transfer of the personal vehicle. The linear speed of the conveyor belts 33 and 35 is equal; this allows the personal vehicle 200 to be carried from the first conveyor belt 33 to the second conveyor belt 35 safely, without interference and without any intervention by the personal vehicle's driver. Another electronic device detects the rear of the personal vehicle when it is completely moved to the second conveyor belt 35 and sends an electronic signal to stop the first conveyor belt 33 and to close the arms of the barrier 34.

Figure 5:
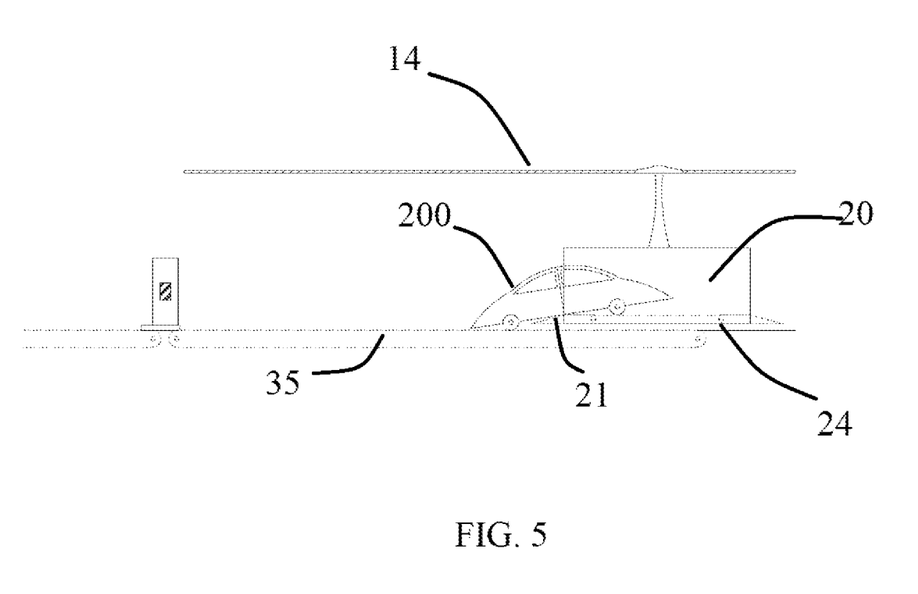
FIG. 5 is a side view of a portion of the continuously moving cableway system in the region, of the first tower, with a car entering into the specially fitted open vehicle transport cabin.

FIG. 5, shows when the personal vehicle 200 enters into the open vehicle transport cabin 20. This is possible because the linear speed of the conveyor second belt 35 is greater than the linear speed of the open vehicle transport cabin 20, which allows the personal vehicle 200 to reach it 20 and be able to enter it 20 easily and safe with the help of a roller entrance ramp 21 located in the lower front part of the open vehicle transport cabin 20.

Figure 6:
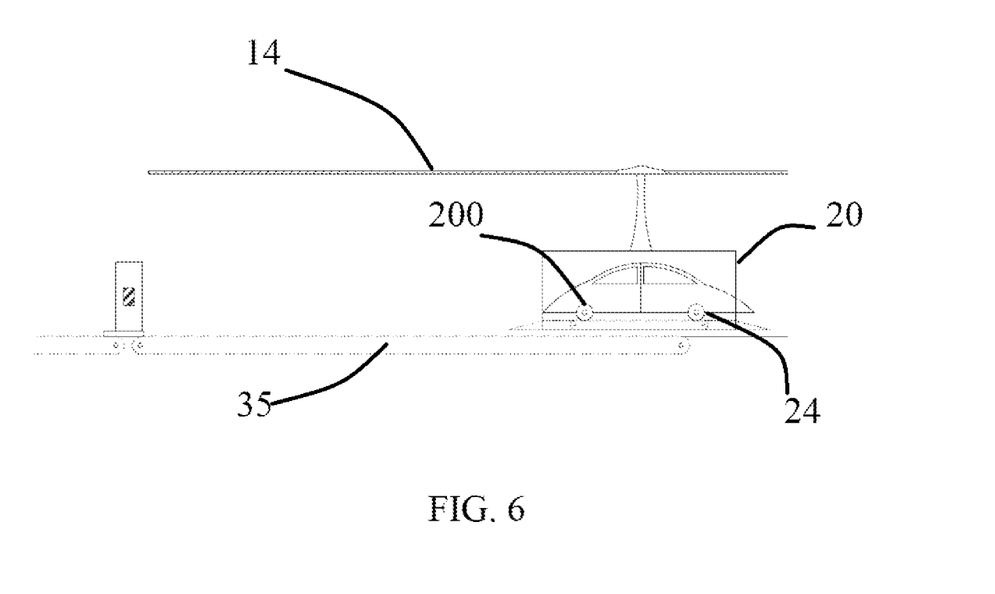
FIG. 6 is a side view of a portion of the continuously moving cableway system in the region of the first tower, with a car into the specially fitted open vehicle transport cabin.

FIG. 6 shows the personal vehicle 200 inside the open vehicle transport cabin 20. A luminous control located at the entrance to the open vehicle transport cabin 20 detects the front of the personal vehicle and sends an electronic signal to activate the cabin conveyor belt 22 (located on the floor of the vehicle transport cabin 20), in order to help the personal vehicle 200 enter fully into the open vehicle transport cabin 20. Another luminous control located at the end of the open vehicle transport cabin 20 detects the front of the personal vehicle and sends an electronic signal to the cabin conveyor belt 22 to stop at the right moment. Simultaneously the hydraulic jacks 26 are activated to place the security gates or locks 28 at ground level in their correct position and in this way to obtain an additional security that does not allow the personal vehicle 200 to leave the open vehicle transport cabin 20 in case of any sudden or unexpected movement. In this way the journey of the open vehicle transport cabin 20 continues with the personal vehicle on board along a determined route or journey which may several minutes or even hours.

FIG. 7 shows the personal vehicle 200 leaving the open vehicle transport cabin 20. At the end of the journey or route an electronic device in the continuously moving cableway system 100 detects the approach of the open vehicle transport cabin 20 and sends an electronic signal to activate the cabin conveyor belt 22 (located on the floor of the cabin). Simultaneously is activated the conveyor belt 38 located at the end of the route as well as the hydraulic jacks 26 to open the security gates or locks 28 to allow the easy and safe exit of the personal vehicle 200 from the open vehicle transport cabin 20 with the help of roller exit ramp 23 located in the lower rear part of the open vehicle transport cabin 20.

FIG. 8 shows the personal vehicle 200 moving away from the open vehicle transport cabin 20. Since the linear speed of the exit conveyor belt 38 is greater than the linear speed of the open vehicle transport cabin 20, this allows the personal vehicle 200 to be moved quickly as soon as it makes contact with the exit conveyor belt 38 and there is no interference when the empty open vehicle transport cabin 20 turns into the curved path. Another electronic device detects the rear of the personal vehicle 200 when it is moves away from the open vehicle transport cabin 20 and sends an electronic signal to stop the cabin conveyor belt 22 (located on the floor of the cabin). The exit conveyor belt 38 will finish carrying the personal vehicle until it reaches the exit of the transfer station 300. Another electronic device detects the rear of the personal vehicle 200 when it moves away from exit conveyor belt 38 and sends an electronic signal to stop the exit conveyor belt 38. A visual signal or a voice recording will indicate to the personal vehicle's driver at the appropriate time that he can to turn on the personal vehicle 200 and to remove the hand or foot brake to continue his journey along of the vehicular road, completing his passage through the continuously moving cableway system 100.

In some embodiments of the present invention, guide rails and terminal stations, such as in the valley station and the mountain station are not provided in the two towers because they are not necessary decoupled from the especially fitted open vehicle transport cabins from the traction cable.

It is, therefore, apparent that the description, claims and appended drawings disclosed herein describe a continuously moving cableway system that transports personal vehicles between two transfer stations.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A cableway system that is used to transport occupied vehicles between a pair of transfer stations, the cableway system comprises:

a pair of towers, each tower is located at each transfer station, each tower is comprised of a cable track support;

at least one cable track that is mounted on the cable track supports, the at least one cable track forms a closed loop between the pair of towers;

a vehicle transport cabin that is fixedly attached to the at least one cable track, the vehicle transport cabin has a cabin conveyor belt that turns on upon sensing a personal vehicle and that loads the personal vehicle up to a certain position on the vehicle transport cabin, a pair of hydraulic jacks that activate a pair of locks to secure the personal vehicle in place on the vehicle transport cabin upon the personal vehicle reaching the certain position, each vehicle transport cabin has a roller entrance ramp and a roller exit ramp;

a pair of entrance conveyor belt systems, each entrance conveyor belt system is comprised of a speed reducer that is immediately followed by first conveyor belt, a barrier that follows the first conveyor belt, and a second conveyor belt that follows the barrier, each entrance conveyor belt system is on an entrance side of each transfer station; and a pair of exit conveyor belts, each exit conveyor belt is at an exit of each transfer station, wherein the speed reducers force a driver to slow down prior to entering the entrance conveyor belt system, the barrier has a sensor that detects the personal vehicle on the entrance conveyor system and that governs the entrance of the personal vehicle on to the cableway system, the first conveyor belt and the second conveyor belt are activated by the barrier, after the barrier is opened, to move at the same speed upon a vehicle transport cabin being detected and upon the personal vehicle clearing the first conveyor belt, the first conveyor belt is stopped and the barrier is closed, the second conveyor belt moves at a greater speed than the vehicle transport cabin so that the personal vehicle will be loaded into the vehicle transport cabin by the movement of the second conveyor belt.

2. The cableway system that is used to transport occupied vehicles between the pair of transfer stations of claim 1, wherein each exit conveyor belt shall be activated to turn on when the vehicle transport cabin is detected, upon the vehicle transport cabin reaching the exit conveyor belt, the hydraulic jacks release the locks and the cabin conveyor belt is activated to take the vehicle out of the vehicle transport cabin, the exit conveyor belts operate at a greater speed than vehicle transfer cabin so that the vehicle clears the vehicle transport cabin safely upon it being unloaded from the cableway system.

* * * * *